(12) United States Patent
Moon

(10) Patent No.: US 6,858,163 B2
(45) Date of Patent: Feb. 22, 2005

(54) ELECTRON EMISSION SOURCE COMPOSITION FOR FLAT PANEL DISPLAY AND METHOD OF PRODUCING ELECTRON EMISSION SOURCE FOR FLAT PANEL DISPLAY USING THE SAME

(75) Inventor: Jong-Woon Moon, Busan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/179,290

(22) Filed: Jun. 26, 2002

(65) Prior Publication Data

US 2003/0062824 A1 Apr. 3, 2003

(30) Foreign Application Priority Data

Sep. 28, 2001 (KR) .......................... 2001-60739

(51) Int. Cl.⁷ .............. H01J 1/30; H01J 9/02; H01J 1/312
(52) U.S. Cl. .............. 252/502; 252/507; 252/510; 252/519.2; 313/346; 313/311
(58) Field of Search ................. 252/502, 507, 252/510, 519.2, 511, 519.31; 313/311, 346

(56) References Cited

U.S. PATENT DOCUMENTS

| 5,908,585 | A | * | 6/1999 | Shibuta | 252/506 |
| 6,517,995 | B1 | * | 2/2003 | Jacobson et al. | 430/320 |
| 6,605,238 | B2 | * | 8/2003 | Nguyen et al. | 252/502 |
| 2003/0090190 | A1 | * | 5/2003 | Takai et al. | 313/311 |

FOREIGN PATENT DOCUMENTS

| JP | 2000-036243 | | 2/2000 | |
| JP | 2000-223004 | * | 8/2000 | ............ H01J/1/304 |
| KR | 2000-0074609 | | 12/2000 | |
| KR | 1020000074609 | * | 12/2000 | ............ H01J/31/15 |
| WO | WO 03/085688 | * | 10/2003 | ............ H01J/1/304 |

* cited by examiner

Primary Examiner—Mark Kopec
Assistant Examiner—Kallambella Vijayakumar
(74) Attorney, Agent, or Firm—McGuire Woods LLP

(57) ABSTRACT

Disclosed is an electron emission source composition for a flat panel display using the same, comprising carbon nanotubes, a vehicle, and an organotitanium or an organo-metallic compound, and a method of producing the electron emission source composition having improved adherent strength with the substrate and providing stable and uniform electron emitting characteristics.

10 Claims, 3 Drawing Sheets

ELECTRON EMISSION SOURCE COMPOSITION FOR FLAT PANEL DISPLAY AND METHOD OF PRODUCING ELECTRON EMISSION SOURCE FOR FLAT PANEL DISPLAY USING THE SAME

This application claims the benefit of Korean Patent Application No. 2001-60739 filed on Sep. 28, 2001, which is hereby expressly incorporated by reference for all purposes as if fully set forth herein.

BACKGROUND OF THE INVENTION

1. Field of the Invention

The present invention relates to an electron emission source composition and a method of producing an electron emission source for a flat panel display using the same, and, more particularly, to an electron emission source composition having an improved adherent strength with the substrate as well as stable and uniform electron emitting characteristics, and a method of producing an electron emission source for a flat panel display using the same.

2. Description of the Related Art

Earlier field emission displays (hereinafter referred to as "FED") were made of a spindt-type electron emission source including Mo or Si, with sharp tips of sub-micron size. Since the spindt-type electron emission source is assembled in a sub-micron size, the method of fabricating the same requires a great deal of attention, and such an operation is considered high-level precision work. Thereby, it is difficult and expensive to produce a large-sized field emission display device.

Carbon material has recently emerged as a potentially useful electron emission source due to its low work function. One carbon material, a carbon nanotube (CNT), is particularly anticipated to be an ideal electron emission source since it features a high aspect ratio and a small tip radii of curvature of 100 Å, and thereby electrons are readily emitted by applying an external voltage of as low as 1~3 V/$\mu$m.

Generally, the electron emission source is fabricated in a such manner that the carbon nanotube is formed in a paste with a solvent, a resin, and so on, and it is applied between substrates by a screen-printing method, then it is sintered. Since the carbon nanotube has a low work function, the resultant electron emission source can be driven by applying low voltages, and the method of fabricating the same is not complicated. It will thereby offer advantages to realize a large size panel display.

However, when the electron emission source is produced with carbon nanotubes by the screen-printing method, each carbon nanotube 1 is roughly mixed with a solid powder present in the paste, and the tips of most carbon nanotubes 1 are covered by the solid powder as shown in FIG. 5. Consequently, the electron emission capabilities are not fully utilized.

Therefore, there are considerable demands to find a way to expose the tips of the carbon nanotubes. As one scheme to satisfy such demands, Korean patent laid-open publication No. 2000-74609 discloses that carbon nanotubes are admixed to metal powders. However, this method requires an additional process to expose and distribute the carbon nanotubes, rendering the process overly complicated.

Further, Japanese patent laid-open publication No. 2000-223004 discloses a method for exposing the carbon nanotubes in which carbon and the metal particulate are mixed and compacted, then the compacted mixture is cut and selectively etched. However, this method is also substantially too complicated and is difficult to be applied to a field emission device of an electron emission array.

Moreover, Japanese patent laid-open publication No. 2000-36243 discloses a method in which a laser beam is irradiated on the surface of a printed pattern in which carbon nanotubes are covered with silver particles combined with a binder, and the silver particles and the binder present on the surface are selectively removed, so that the carbon nanotubes are exposed. However, the method has a concern in that the carbon nanotubes get thermally damaged by the laser irradiation.

SUMMARY OF THE INVENTION

It is an object of the present invention to provide an electron emission source composition capable of increasing the adherent strength onto the cathode and providing stable and uniform electron emission characteristics.

It is another object to provide a method of producing an electron emission source for a flat panel display using the above-mentioned composition.

It is still another object to provide a flat panel display using the above-mentioned composition.

These and other objects may be achieved, according to an embodiment of the present invention, by an electron emission source composition including carbon nanotubes, a vehicle, and an organotitanium or an organometallic compound.

In order to achieve these objects and others, the present invention further provides a method of producing an electron emission source for a flat panel display including mixing carbon nanotubes, a vehicle, and an organotitanium, or an organometallic compound, to provide a carbon nanotube composition; screen-printing the carbon nanotube composition onto a substrate; and sintering the resultant substrate.

The present invention further provides a flat panel display including a substrate, an electrode formed on the substrate and an electron emission source layer formed on the electrode, the layer having micro-cracks of at or between 0.1 and 100 $\mu$m.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
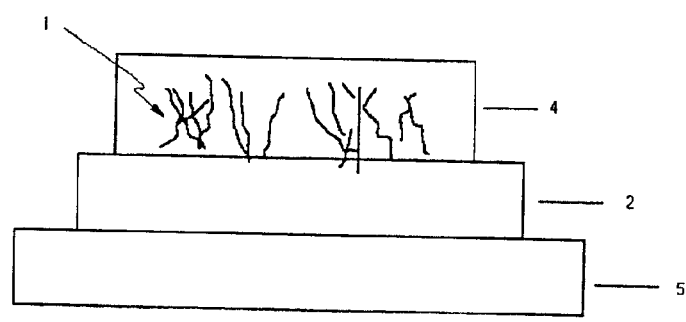
FIG. 1 is a schematic cross-sectional view showing a substrate in which an electrode is coated with the electron emission source composition according to an embodiment of the present invention.

The present invention relates to an electron emission source composition including carbon nanotubes as an electron emission source of a filed emission device. The composition includes a vehicle and an organotitanium, or an organometallic compound, in addition to the carbon nanotubes.

The contents of organotitanium or the organometallic compound are preferably 20 to 95 wt %, and more preferably 40 to 95 wt %. In a case when the content of the organotitanium or the organometallic compound is less than 20 wt %, it is hard to make micro-cracks on the carbon nanotube layer; whereas, when the content is more than 95 wt %, the relative amount of the electron emission source is overly decreased and too many cracks are generated for the carbon nanotube layer to adhere to and to be printed on the substrate. The represented examples of organometallic compounds available in the present invention include, but are not limited to, any organometallic compound including metals belonging to 3, 4, 5, and 6 groups of the Periodic tables. These include Ti, Si, B, Ta, Nb, Zr, Sn, Sr, Al, or In, specifically, $Si(O-n-C_4H_9)_4$, $Al(iC_4H_9)_3$, and $Ti(O-n-C_3H_7)_4$. However, it is understood that any material capable of generating micro-cracks during the sintering process can be included without departing from the scope of the disclosed invention.

The term carbon nanotube means any material generated from the chemical potential difference between a catalyst and a carbon material, which is induced from a thermal decomposition process, the material also having a tube-like or cylinder-like shape and having a diameter of about 1 to 10 nanometers. Nanotubes may be classified into a single wall nanotube, a multi-wall nano-tube, and a coil nanotube, according to the coiled form thereof. The electron emission source composition according to the present invention includes carbon nanotubes of 5 to 80 wt % based on the total weight of the composition, and more preferably 5 to 60 wt %. The content is determined by considering the amounts of the organotitanium, or the organometallic compound, and the vehicle.

The vehicle is intended to improve the printability, so it has a role to adjust viscosity, concentration, and so on. It may include any conventional material capable of being used in a paste composition. The vehicle includes a thickener, a binder, and a solvent. The thickener is used to enhance the adherent strength between layers, and it includes a silicone-based material and a mineral oil such as terpineol. Further, the binder includes an organic resin such as ethyl cellulose, acryl resin, epoxy resin, and so on. The solvent includes butyl carbitol acetate, terpineol, ethyl cellulose, ethyl carbitol, or any organic solvent such as animal oil and vegetable oil.

As the vehicle is for facilitating the printing of the paste composition, it will be completely removed by evaporation during sintering of the printed substrate. The amount of the vehicle used will be adjusted depending on the amounts of main components such as carbon nanotubes and organotitanium, or an organometallic compound, in the electron emission source composition.

Figure 2:
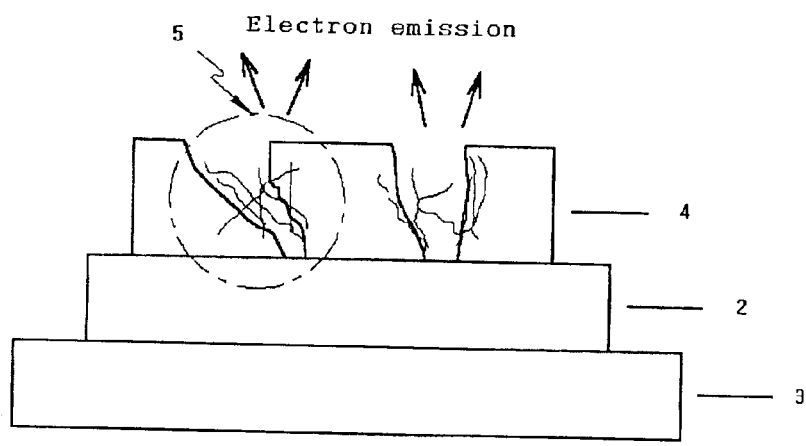
FIG. 2 is a schematic cross-sectional view showing a substrate in which micro-cracks are formed on the surface of a carbon nanotube layer according to an embodiment of the present invention.

In an embodiment of the present invention, with reference to FIGS. 1 and 2, the method of producing the electron emission source commences with the step of adding organotitanium, or an organometallic compound, to a mixture of carbon nanotubes 1 and the vehicle, to provide an electron emission source composition layer 4.

The resultant electron emission source composition is applied to the cathode 2 formed on the substrate 3 by the screen-printing method, to form an electron emission source composition layer 4 on the cathode 2 (FIG. 1). Subsequently, the substrate 3 printed with the electron emission source composition layer 4 is sintered at or between 250 and 600° C. The sintering temperature is determined in an appropriate range by considering the complete combustion temperature of the organometallic compound and the oxidation temperature of the carbon nanotubes 1. During the sintering process, the vehicle is completely removed by evaporation, and micro-cracks 5 of at or between 0.1 and 100 μm are generated on the surface of the electron emission source composition layer 4 due to the presence of the organotitanium, or the organometallic compound, so that the carbon nanotubes 1 are exposed (FIG. 2).

Consequently, the carbon nanotubes 1 of the present invention can provide stable and uniform electron-emitting characteristics. Further, by using the organotitanium, or the organometallic compound, as a binder, the carbon nanotubes 1 are easily adherent to the cathode 2, and the micro-cracks 5 are presented on the surface of the electron emission source composition layer 4. Thereby, the carbon nano-tubes 1 are exposed through the micro-cracks 5 so that it is possible to provide stable and uniform electron emitting characteristics.

The following examples illustrate embodiments of the present invention in further detail. However, it is understood that the present invention is not limited by these examples.

EXAMPLE 1

In this example, 40 wt % of carbon nanotubes 1 was mixed with 20 wt % of a terpineol solvent. To this mixture, 40 wt % of an organometallic compound $Ti(O-nC_3H_7)_4$ was added to obtain an electron emission source composition 4.

The obtained electron emission source composition 4 was applied to the cathode 2 formed on the substrate 3 by the screen-printing method, and it was sintered at 400° C. for 30 minutes.

Figure 3:
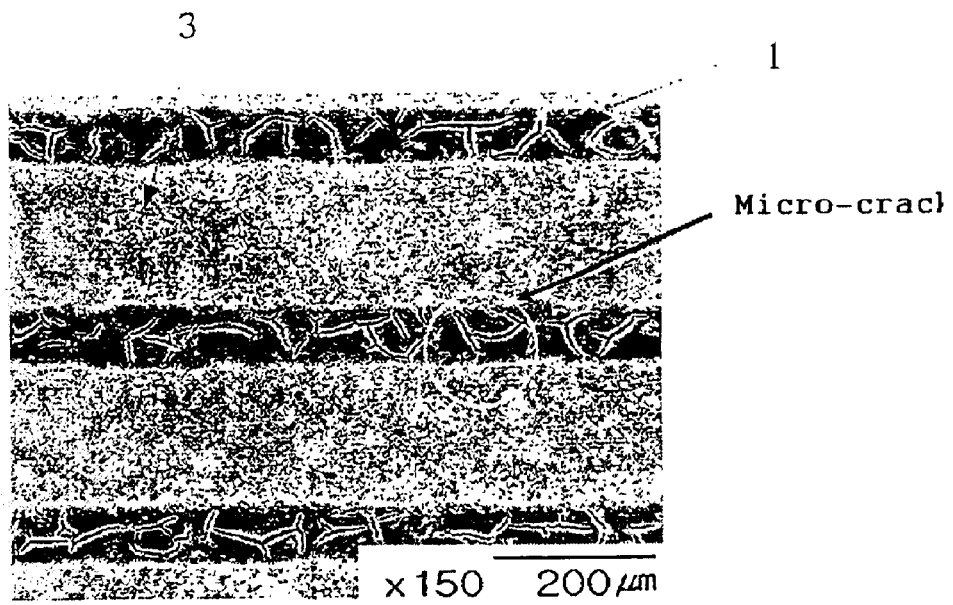
FIG. 3 is a scanning electron microscope (SEM) photograph showing the surface of an electron emission source according to Example 1 of an embodiment of the present invention.
Figure 4:
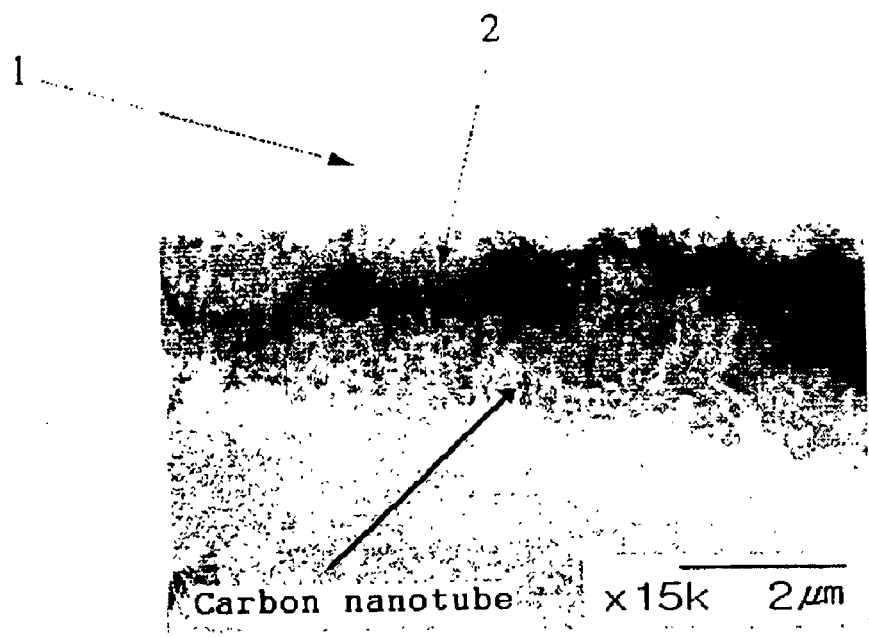
FIG. 4 is a 100-fold enlarged SEM photograph of the SEM photograph of FIG. 3.
Figure 5:
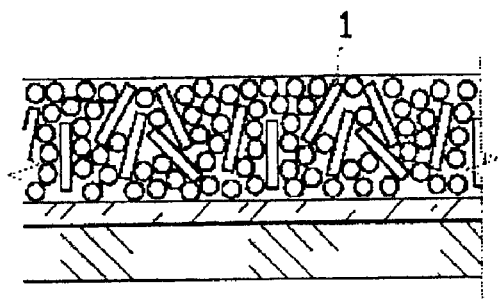
FIG. 5 is a schematic view showing a conventional electron emission source.

FIG. 3 shows a SEM photograph of the surface of the resultant electron emission source 4 fabricated by the method according to Example 1, and FIG. 4 shows the SEM photograph magnified 100-fold from that of FIG. 3. A carbon nanotube is represented as 1, a cathode is 2, and a substrate is 3 in FIGS. 3 and 4. As shown in FIGS. 3 and 4, it is recognized that the carbon nanotubes 1 are exposed through the micro-cracks 5 on the surface of the electron emission source composition layer 4 according to an embodiment of the present invention.

The electron emission source composition 4 of the present invention is prepared by adding the organotitanium, or the organometallic compound, to the carbon nanotubes 1 so that micro-cracks 5 are generated on the resultant electron emission source composition layer 4 during the sintering step. It is thereby possible for the carbon nanotubes 1 to increase the adherent strength relative to the substrate 3, as well as to provide stable and uniform electron emitting characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electron emission source composition comprising:
   carbon nanotubes;
   a vehicle; and
   an organotitanium or an organometallic crack formation compound.

2. The composition according to claim 1, wherein the carbon nanotubes are present at or between 5 and 80 wt %, and the organotitanium or the organometallic compound is present at or between 20 and 95 wt %.

3. The composition according to claim 2, wherein the carbon nanotubes are present at or between 5 and 60 wt %, and the organotitanium or the organometallic compound is present at or between 40 and 95 wt %.

4. The composition according to claim 1, wherein the organometallic compound comprises one of metals belonging to 3, 4, 5 and 6 groups of the Periodic tables.

5. The composition according to claim 1, wherein the organometallic compound comprises one selected from the group consisting of Ti, Si, B, Ta, Nb, Zr, Sn, Al and In.

6. The composition according to claim 1, wherein the organometallic compound comprises one of $Si(O-n-C_4H_9)_4$, $Al(iC_4H_9)_3$, and $Ti(O-n-C_3H_7)_4$.

7. The composition according to claim 1, wherein the vehicle includes a binder and a solvent.

8. The composition according to claim 7, wherein the binder includes an organic resin.

9. The composition according to claim 7, wherein the solvent includes one selected from the group consisting of butyl carbitol acetate, terpineol, ethyl cellulose, ethyl carbitol, animal oil and vegetable oil.

10. An electron emission source comprising:

carbon nanotubes; and an organotitanium and organometallic compound, wherein the electron emission source comprises crack.

* * * * *